UNITED STATES PATENT OFFICE.

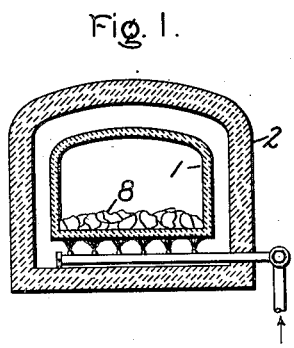
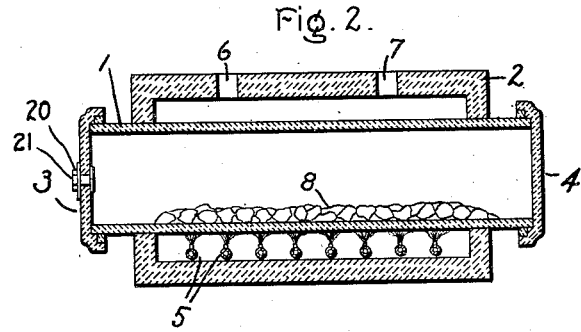
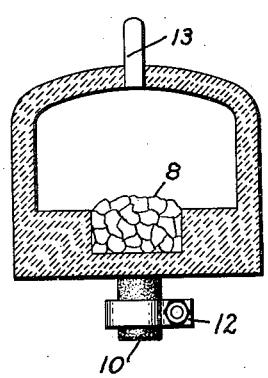
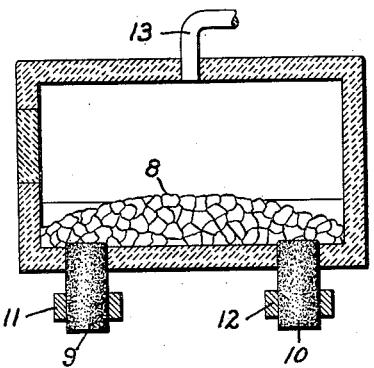
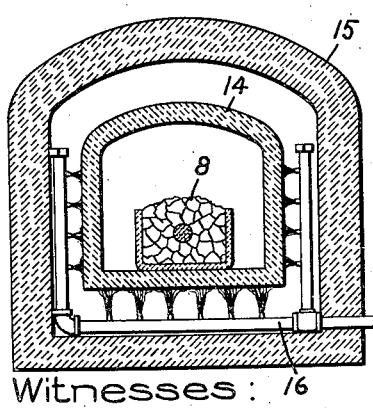
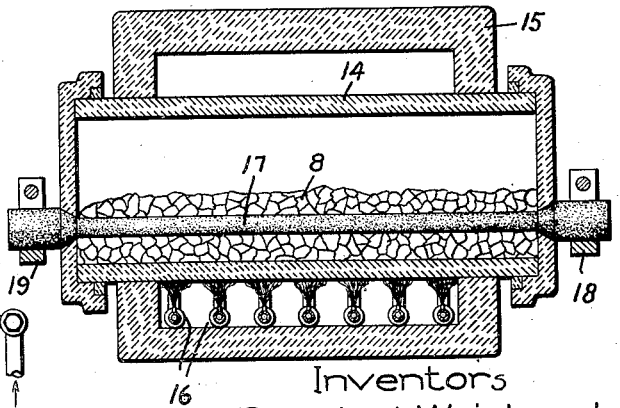

EZECHIEL WEINTRAUB AND FRANK A. KRONER, OF LYNN, MASSACHUSETTS, ASSIGNORS TO GENERAL ELECTRIC COMPANY, A CORPORATION OF NEW YORK.

REFRACTORY FIBROUS MATERIAL AND PROCESS OF MAKING THE SAME.

1,094,352. Specification of Letters Patent. Patented Apr. 21, 1914.

Application filed May 2, 1913. Serial No. 764,997.

*To all whom it may concern:*

Be it known that we, EZECHIEL WEINTRAUB and FRANK A. KRONER, citizens of the United States, residing at Lynn, county of Essex, State of Massachusetts, have invented certain new and useful Improvements in Refractory Fibrous Material and the Processes of Making the Same, of which the following is a specification.

The present invention relates to a refractory, fibrous material of low density containing silicon, carbon and oxygen and valuable particularly for heat insulating purposes.

It has been observed by various investigators that under certain conditions silicon combines with carbon monoxid, or carbon dioxid, to form a woolly or downy material. This material was often found in the carborundum furnace, particularly when it was not operating under the best conditions. The material thus was produced in an irregular and accidental manner in small quantities and manufacture on a large scale could not be attempted. In the course of our work we have discovered the conditions necessary for the formation of a material of this general nature but having different chemical and physical properties rendering it better suited for technical utilization. As the most important commercial application of the material is as a heat insulator, and as the heat conductivity is dependent very largely upon the physical state, the conditions under which the material is made are unusually important.

In accordance with our invention silicon or silicon producing material is heated in the presence of a catalyzer, such as calcium fluorid, and brought into contact with gases containing monoxid, or dioxid, of carbon, or a mixture of the two. This can be most efficiently accomplished by diffusion of the gases through a porous wall thus promoting the best development of the material in a fibrous form. This step, as well as the discovery and use of a suitable catalyzing substance, constitute important features of our invention.

The accompanying drawings illustrate several kinds of apparatus suitable for carrying out our invention.

Figures 1 and 2 are sectional views taken at right angles to each other illustrating a gas-fired furnace in which silicon is vaporized in a porous container into which combustion gases diffuse; Figs. 3 and 4 are sectional views of an electrically heated furnace into which carbonoxid gases are introduced through a tube; and Figs. 5 and 6 illustrate a combination furnace in which silicon is vaporized electrically but the gases are supplied by diffusion through a porous wall.

Referring to Figs. 1 and 2, it will be noted that a muffle 1 of fire brick or other porous material is so located within a combustion chamber 2 that its ends 3 and 4 project out of the heating zone, so that they may be easily kept cool to maintain the seal gas-tight. The combustion chamber is provided with gas burners 5, but it may also be heated by combustion of coal or other fuel. It is provided with gas outlets 6 and 7. When the furnace is charged, a mixture 8 of silicon in the form of small lumps and a suitable catalyzer, such as calcium fluorid, is placed in the muffle 1 and the covers 3 and 4 are carefully sealed, by luting with a fire-clay, or other suitable refractory cement.

While the proportions may be varied to a considerable extent, we prefer to use about eight parts of silicon to about one to two parts of catalyzer. Substances other than calcium fluorid may be used as catalyzers to hasten the reaction between the silicon and oxids of carbon, for example, cerium fluorid, calcium silico-fluorid, pumice, etc. A mixture of different catalyzers is sometimes advantageous, for example, pumice may to advantage be added to the calcium fluorid. If no catalyzer is used the reaction stops after a thin surface layer of the material is formed. When the muffle has been thus charged and sealed it is heated to a temperature somewhat below the melting point of silicon, that is, to about 1300 to 1400° C., the burning gases being allowed to play around and come in contact with the walls of the retort. This heating is continued for a time dependent upon the size of the retort, for instance, a retort about one foot high is maintained at this temperature from one to three hours.

When the retort is opened after it has been allowed to cool, the space above the silicon will be found to be filled with a fluffy, or fibrous material, greenish or white in color and so light that its apparent density in mass is as low as .0070 to .0025. The material consists of interlacing fibers having a real density of about 1.8. Chemically the material contains silicon, oxygen and carbon and appears to be an oxycarbid of silicon. Upon analysis, about 19–20% of carbon usually have been found but its composition is somewhat variable. In some cases the carbon contact may approach 6%, and in other cases vary all the way between the two limits, but the product is most suitable for heat insulating purposes when its composition approaches that of a silicon oxycarbid (SiCO), which calls for about 21% carbon. In other words, the best form of my new material for heat insulating purposes contains silicon, carbon and oxygen substantially in atomic proportions. About 30% of the material with a high carbon content is soluble in hydrofluoric acid.

The heat capacity and heat conductivity of the material are extremely low. For example, with a density of eight grams per liter, or 250 grams per cubit foot, the thermal resistivity between 100° C. and ordinary room temperature is about 1600–1650 thermal ohms, the thermal ohm expressing degrees, per watt, per cubic inch and corresponding to the following formula:

$$\frac{T-t}{W} \frac{A}{L}$$

where T=temperature at one side of the insulation; t=temperature at the opposite side; W=watts of energy transmitted; A= area in inches and L=thickness of insulation. To compare this heat insulating property with other well-known materials it may be said in the same units wool has a resistance of 1100, at a density of about 1540 grams per cubic foot and reaches 1600 only at a density of about 5450 grams per cubic foot. Eiderdown, the best known heat insulating material up to the present has a thermal resistivity of 1600 only when the density is about 2270 grams per cubic foot. Of course, wool and eiderdown cannot be used at high temperatures. The material is self-supporting and so does not pack when subjected to vibrations. It is non-hygroscopic. All these properties combined with its highly refractory character make it an ideal heat insulator and render it particularly valuable as an insulator for electrical heating devices, stoves, furnaces, and the like.

As illustrated in Figs. 3 and 4, silicon may be vaporized electrically by passage of current introduced by electrodes 9 and 10, or any other suitable manner. As shown in these figures the silicon charge 8 is placed in a trough in the bottom of a furnace between the electrodes 9 and 10, the electrical contacts 11 and 12 of which are outside of the furnace. The carbon monoxid or carbon dioxid gas may be introduced through a tube 13 into the top of the furnace and allowed to diffuse and come in contact with the silicon vapors. In this case, however, the rapidity of the formation of the material is not as favorable to the best development of the fibers as the process involving diffusion of the gases through a porous wall.

In a furnace as illustrated in Figs. 5 and 6 the advantages of both the localized electrical heating and the slow formation of fibrous material may be gained. In this furnace a muffle 14 is placed within a combustion chamber 15 which is heated by gas introduced by the burner 16, similar to the furnace described in connection with Figs. 1 and 2. The silicon vapors, however, are evolved by heating the charge 8 by means of an electrical resister 17 provided with enlarged ends and suitable contacts 18 and 19. In this manner the temperature necessary for vaporization of the silicon, namely 1300 to 1400° C. may be obtained locally without the necessity of heating the muffle and its surrounding combustion chamber to this high temperature. The muffle is thus heated only to a temperature of about 600°– 1000° C. so as to permit the oxids of carbon to rapidly diffuse through the walls of the muffle at a rate suitable to the formation of the best material.

In order to watch the progress of the reaction a window may be provided in the cover as shown in Fig. 1. It is conveniently made by inserting a quartz tube 20, closed with a sheet of mica 21. In some cases a small hole may be left in the mica, to allow expanding air and some water to escape. When the reaction has begun the hole, is preferably, but not necessarily closed.

What we claim as new and desire to secure by Letters Patent of the United States, is,—

1. The process of forming fibrous silicon oxy-carbid which consists in heating silicon and calcium fluorid in a closed space and gradually diffusing oxids of carbon into said space.

2. The process of making a light, fibrous silicon-carbon-oxygen compound of low heat conductivity which consists in heating a mixture of silicon and a catalyzer near the melting point of silicon in a space inclosed in part at least by a wall permeable to gas and diffusing through said wall oxid of carbon.

3. The process of making a refractory fibrous silicon-carbon-oxygen compound which consists in heating a charge containing silicon-evolving material and calcium fluorid to a temperature of 1300 to 1400° C. in a closed space, and admitting an oxid of carbon into said space.

4. The process of forming fibrous silicon-oxycarbid which consists in heating silicon to near its fusing temperature in the presence of a catalyzer in a closed space and slowly diffusing oxid of carbon into said space.

5. The process of forming a fibrous, refractory silicon-carbon-oxygen product which consists in heating silicon in a space inclosed in part at least by a porous wall and diffusing through said wall a gaseous carbon compound.

6. The process of forming a fibrous, refractory silicon-carbon-oxygen compound which consists in heating silicon to near the melting point in contact with a catalyzer in a closed space and admitting into said space an oxid of carbon.

7. The process of forming a fibrous refractory silicon-carbon-oxygen compound which consists in heating silicon in contact with calcium fluorid in a closed space and passing into said space an oxid of carbon.

8. The process of forming a fibrous refractory silicon-carbon-oxygen compound which consists in heating silicon electrically in the presence of a catalyzer and admitting into the space above it an oxid of carbon.

9. The process of forming a fibrous refractory silicon-carbon-oxygen material which consists in heating silicon and a catalyzer in a closed retort, part at least of the inclosing wall being porous, heating said retort by the combustion of carbonaceous material, and permitting the products of combustion to come into contact with said retort whereby diffusion of the combustion gases is caused to take place.

10. The process of forming a fibrous refractory silicon-carbon-oxygen material which consists in heating silicon and calcium fluorid in a closed retort, part at least of the inclosing wall being porous, heating said retort by the combustion of carbonaceous material, and permitting the products of combustion to come into contact with said retort whereby diffusion of the combustion gases is caused to take place.

11. A refractory heat insulating material, comprising interlacing fibers having a real density of about 1.8 and an apparent density of about .0025 to .0070, containing silicon, carbon and oxygen.

12. A fibrous, refractory heat-insulating material having a mass density of about .0025 to .0070, and a heat conductivity of about 1600 thermal ohms near room temperature at a density of about eight grams per liter, said material containing silicon and oxygen and materially more than 6% carbon.

13. A refractory, fibrous, heat insulating material containing silicon, carbon and oxygen, having a real density of about 1.8, an apparent density of about .0070 to .0025, and being soluble in hydrofluoric acid to the extent of about 30% by weight.

14. A refractory, fibrous, heat insulating material having a real density of about 1.8, a thermal resistivity approximating that of wool and eiderdown, and containing silicon, carbon and oxygen substantially in atomic proportions.

15. A refractory, fibrous heat insulating material containing silicon, carbon and oxygen as elementary constituents, having a mass density of about 0.0070 to 0.0025 and having a thermal resistivity superior to that of wool and eiderdown.

16. The process of forming a fibrous, refractory silicon-carbon-oxygen compound which consists in heating silicon in the presence of a catalyzer and admitting into the space above it an oxid of carbon.

In witness whereof, we have hereunto set our hands this 25th day of April, 1913.

EZECHIEL WEINTRAUB.
FRANK A. KRONER.

Witnesses:
  JOHN A. McMANUS, Jr.,
  ROBERT SHAND.